(12) United States Patent
Milius (10) Patent No.: US 7,610,583 B2
(45) Date of Patent: Oct. 27, 2009

(54) PERSONALIZED SOFTWARE INSTALLATION METHOD FOR COMPUTER MANUFACTURERS

(75) Inventor: Daniel C. Milius, Huntington Beach, CA (US)

(73) Assignee: Gateway, Inc., Poway, CA (US)

( * ) Notice: Subject to any disclaimer, the term of this patent is extended or adjusted under 35 U.S.C. 154(b) by 556 days.

(21) Appl. No.: 10/127,884

(22) Filed: Apr. 23, 2002

(65) Prior Publication Data

US 2003/0197727 A1 Oct. 23, 2003

(51) Int. Cl.
*G06F 9/445* (2006.01)
*G06F 3/00* (2006.01)

(52) U.S. Cl. ........................ 717/177; 717/178; 715/707; 715/708

(58) Field of Classification Search ................. 717/174, 717/105, 175, 171, 172, 177; 713/200, 2, 713/100; 715/744, 707
See application file for complete search history.

(56) References Cited

U.S. PATENT DOCUMENTS

| 5,561,742 | A | * | 10/1996 | Terada et al. ................. 700/255 |
| 5,745,568 | A | * | 4/1998 | O'Connor et al. ............. 705/56 |
| 5,887,164 | A | * | 3/1999 | Gupta ............................. 713/2 |
| 5,950,001 | A | * | 9/1999 | Hamilton et al. ............ 717/107 |
| 5,963,939 | A | * | 10/1999 | McCann et al. ................ 707/4 |
| 6,016,400 | A | * | 1/2000 | Day et al. .................... 717/175 |
| 6,035,395 | A | * | 3/2000 | Saito ............................. 713/1 |
| 6,076,103 | A | * | 6/2000 | Sakai .......................... 709/217 |
| 6,080,207 | A | * | 6/2000 | Kroening et al. ............ 717/172 |
| 6,092,189 | A | * | 7/2000 | Fisher et al. .................... 713/1 |
| 6,154,835 | A | * | 11/2000 | Chrabaszcz et al. ............ 713/1 |
| 6,247,128 | B1 | | 6/2001 | Fisher et al. ................. 713/100 |
| 6,257,774 | B1 | * | 7/2001 | Stack .......................... 717/110 |
| 6,279,155 | B1 | | 8/2001 | Amberg et al. ................ 717/11 |
| 6,279,156 | B1 | | 8/2001 | Amberg et al. ................ 717/11 |
| 6,292,941 | B1 | | 9/2001 | Jollands ........................ 717/11 |
| 6,298,443 | B1 | | 10/2001 | Colligan et al. ............. 713/200 |
| 6,301,707 | B1 | * | 10/2001 | Carroll et al. ............... 717/177 |
| 6,466,654 | B1 | * | 10/2002 | Cooper et al. ............. 379/88.01 |
| 6,487,522 | B1 | * | 11/2002 | Smith et al. ................. 702/186 |
| 6,543,047 | B1 | * | 4/2003 | Vrhel et al. .................. 717/121 |
| 6,591,363 | B1 | * | 7/2003 | von Below ..................... 713/2 |
| 6,598,095 | B2 | * | 7/2003 | Peterson ........................ 710/8 |
| 6,715,144 | B2 | * | 3/2004 | Daynes et al. .............. 717/174 |
| 6,775,829 | B1 | * | 8/2004 | Kroening ..................... 717/175 |

(Continued)

OTHER PUBLICATIONS

Microsoft TechNet Archive, "Windows 95 Setup Overview", Microsoft.com, internet retrieved from <http://www.microsoft.com/technet/archive/win95/rk03_set.mspx>, 1998. (31 pages).*

(Continued)

*Primary Examiner*—Tuan Q Dam
*Assistant Examiner*—Thuy Dao
(74) *Attorney, Agent, or Firm*—Pearne & Gordon LLP (57) ABSTRACT

Systems and methods for providing a customized installation procedure to a consumer purchasing a build to order system. A particular consumer may provide personal information at a point of sale along with component selections for a build to order system. A manufacturer may assemble the personal information and selection list to generate a customized installation procedure for each consumer. The customized installation procedure may be placed upon a compact disk and may be inserted upon a first boot of a purchased build to order computer system. The customized installation procedure may provide a visual presentation on the complete installation of the computer system including software installation and connection of hardware components.

28 Claims, 7 Drawing Sheets

U.S. PATENT DOCUMENTS

| | | | |
|---|---|---|---|
| 6,857,877 B1 * | 2/2005 | Watanabe | 434/219 |
| RE38,762 E * | 7/2005 | O'Connor | 713/2 |
| 6,948,169 B1 * | 9/2005 | Amro et al. | 717/178 |
| 6,952,767 B1 * | 10/2005 | Tanaka | 713/100 |
| 7,072,728 B2 * | 7/2006 | Montano et al. | 700/97 |
| 7,188,255 B1 * | 3/2007 | Toh et al. | 713/191 |
| 2002/0188938 A1 * | 12/2002 | Dong et al. | 717/174 |
| 2003/0046674 A1 * | 3/2003 | Gentry et al. | 717/171 |

OTHER PUBLICATIONS

"Virtual Oregon: seamless access to distributed environmental information", Keon et al., Dec. 2002, p. 387. Online retrieved at <http://delivery.acm.org/10.1145/550000/544334/p387-keon.pdf>.*

"Digital manufacturing: driving digital manufacturing to reality", R. Brown, Dec. 2000, pp. 224-228. Online retrieved at <http://delivery.acm.org/10.1145/520000/510416/p224-brown.pdf>.*

* cited by examiner

PERSONALIZED SOFTWARE INSTALLATION METHOD FOR COMPUTER MANUFACTURERS

FIELD OF THE INVENTION

The present invention generally relates to the field of installation instruction, and more particularly to an apparatus and method for providing a customized installation procedure to a customer regarding the installation of a build to order system.

BACKGROUND OF THE INVENTION

Consumers tend to desire multiple and unique applications from their respective computing systems. For example, a first consumer may desire a computer system equipped to handle digital photography while a second consumer is interested in the retrieval, storage, and playback of audio files. When a consumer purchases a new computer, they may desire that the new computer is equipped to provide complete solutions that are specific to their needs. These solutions often include hardware and software components. Original equipment manufacturers generally try to reduce costs by opting not to pre-install or configure specialized components at the factory. These components are often packaged with a personal computer as separate products.

Printed instructions included with the purchased system may help consumers in the basic installation procedures of a personal computer. However, printed instructions do not provide instruction regarding the installation and configuration to meet the a consumer's specific needs. Thus, a method of providing instruction regarding the complete installation of a build to order system is lacking. Consequently, an apparatus and method for providing an installation procedure to a customer regarding the installation of a build to order system is necessary.

SUMMARY OF THE INVENTION

Accordingly, the present invention is directed to an apparatus and method for providing a customized installation procedure to a customer regarding the installation of a build to order system. In one embodiment of the invention, specific customer information related to the purchase of a build to order system may be assembled. Utilizing the customer information and a list of component and configuration selections for a build to order system, a customized installation procedure may be provided to allow an easier and less confusing installation.

In a second aspect of the invention, a build to order system may be configured to prompt a user to insert a removable storage media containing the customized installation procedure upon the first boot of the build to order system. A presentation customized to the specific customer may be delivered to the customer and may include the installation steps of the components of the solution. This may include the prompting of the customer to connect various hardware components to the computer and prompting the customer to insert specific storage media.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
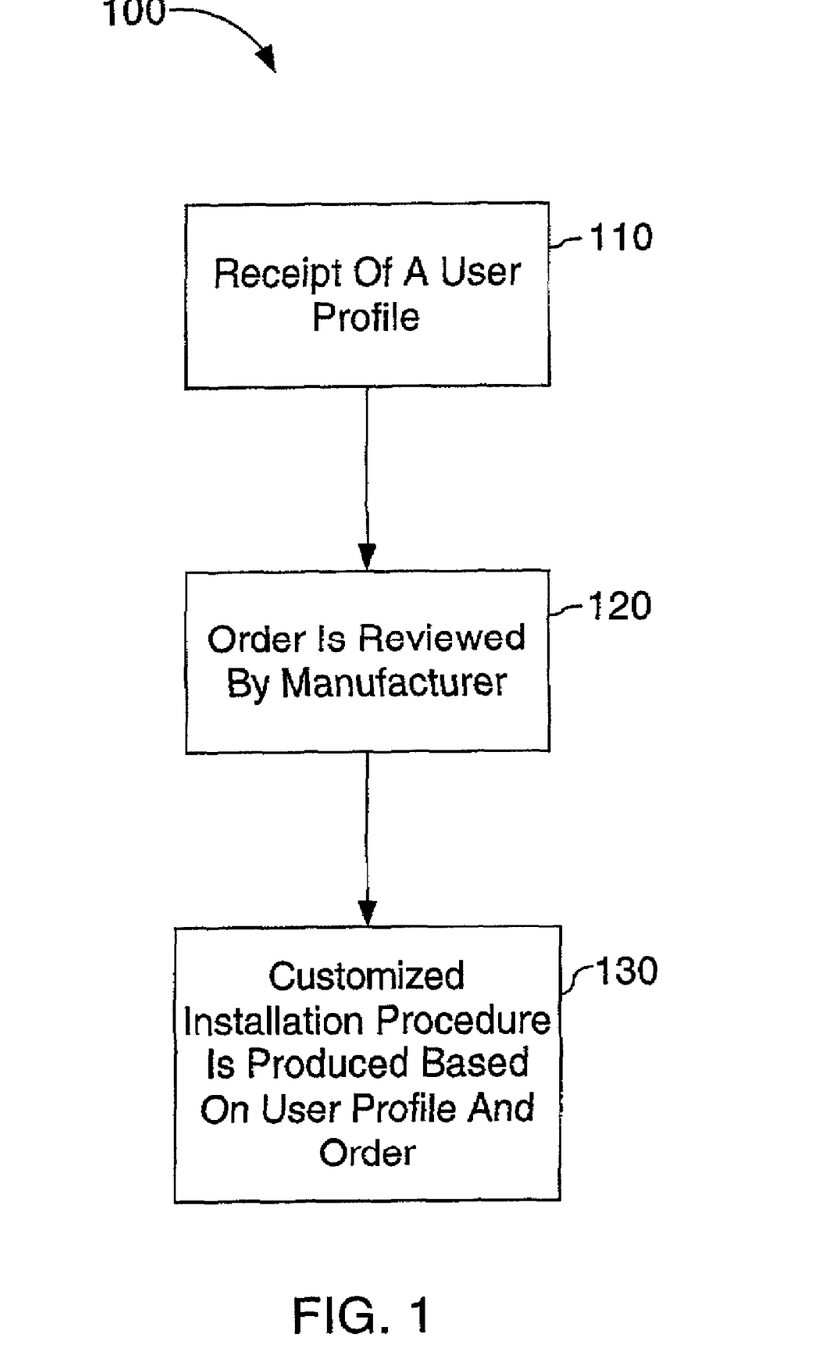
FIG. 1 is an embodiment of a method of the present invention to produce customized instructions.

Referring to FIG. 1, an embodiment of a method 100 of the present invention to produce customized instructions is shown. In one embodiment of the invention, method 100 may be employed to provide a user with a customized set of instructions for installation and configuration of a build to order system, such as a build to order computer system. Method 100 may begin upon the receipt of a user profile 110. A user profile may include a user's name, sex, age, and other personal characteristics including a shipping address. Each user may desire a computer system which provides solutions specific to each user's needs, thus a build to order system may include different and unique components, software, and hardware. When a purchase has been completed, an order that specifies the components, software, hardware and peripherals of a user's build to order system is reviewed by a manufacturer, such as an original equipment manufacturer 120. In one embodiment of the invention, an original equipment manufacturer produces an installation procedure based upon a user profile and a received order to provide customized installation instructions for each user 130. The installation procedure may be a visual presentation that includes diagrams, charts, pictures, and animated features. This is highly advantageous as it may allow a user to correctly install and configure his or her computer system in an easier and less confusing fashion.

Figure 2:
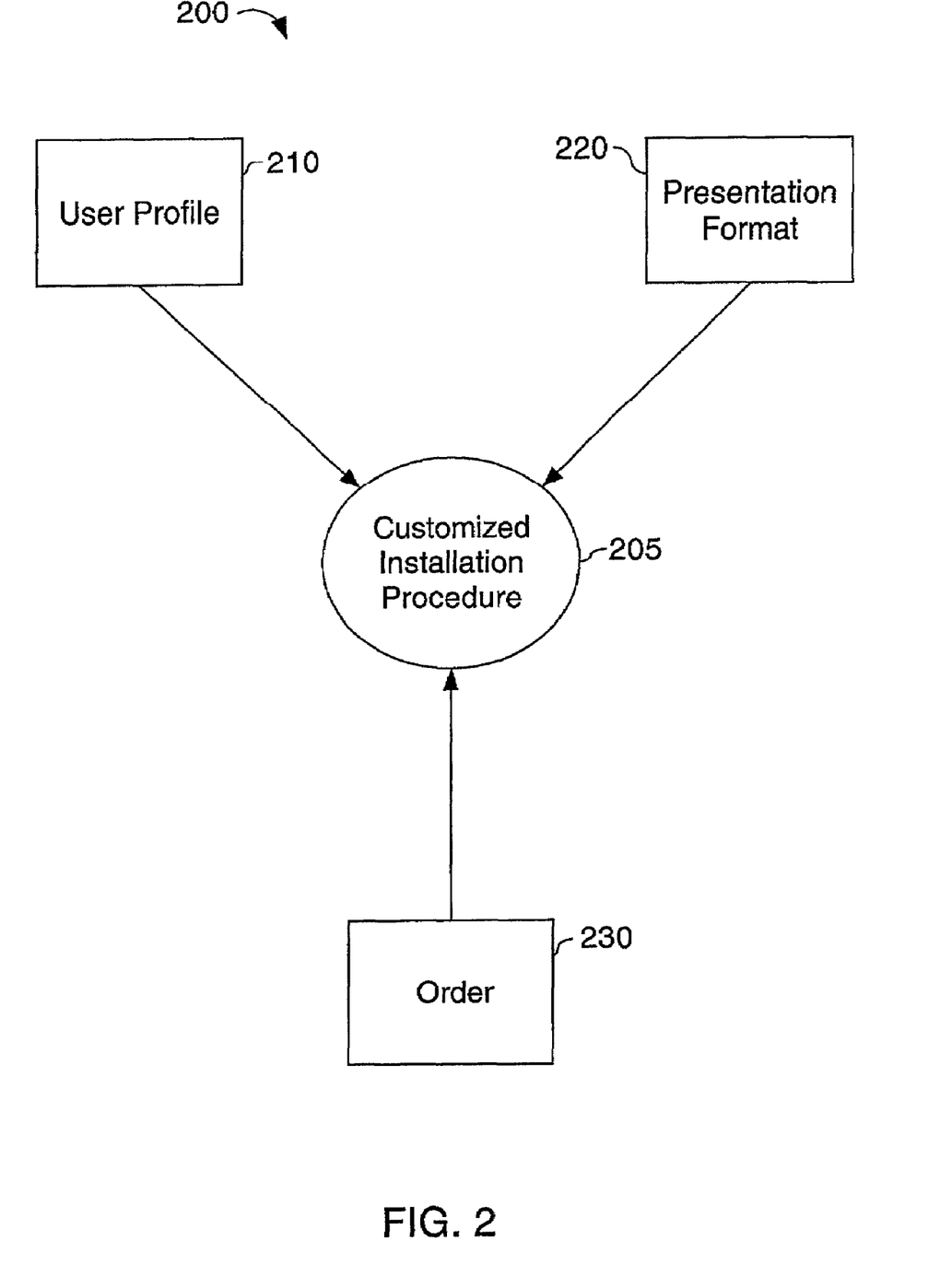
FIG. 2 is a an embodiment depicting exemplary factors that may be considered during the assembly of a customized installation procedure.

Referring now to FIG. 2, an embodiment depicting exemplary factors 200 that may be considered during the assembly of a customized installation procedure 205 is shown. In one embodiment of the invention, a user profile 210 may include the user's name, age, and sex. For example, a customized installation procedure 205 may include larger type font for older users and different musical backgrounds based upon age. A presentation format 220 may include a user's self-proclaimed technical ability and desired presentation characteristics. For example, a person familiar with computers may require less instruction than a first-time user. Also, presentation characteristics may include desired features such as charts, pictures, animated features and the like. An order 230 may include a list of the software, hardware, peripherals, and the like that have been included in the purchase of a build to order computer system. This is advantageous as a user may only receive instruction regarding the installation and configuration that is applicable to their build to order computer system.

Figure 3:
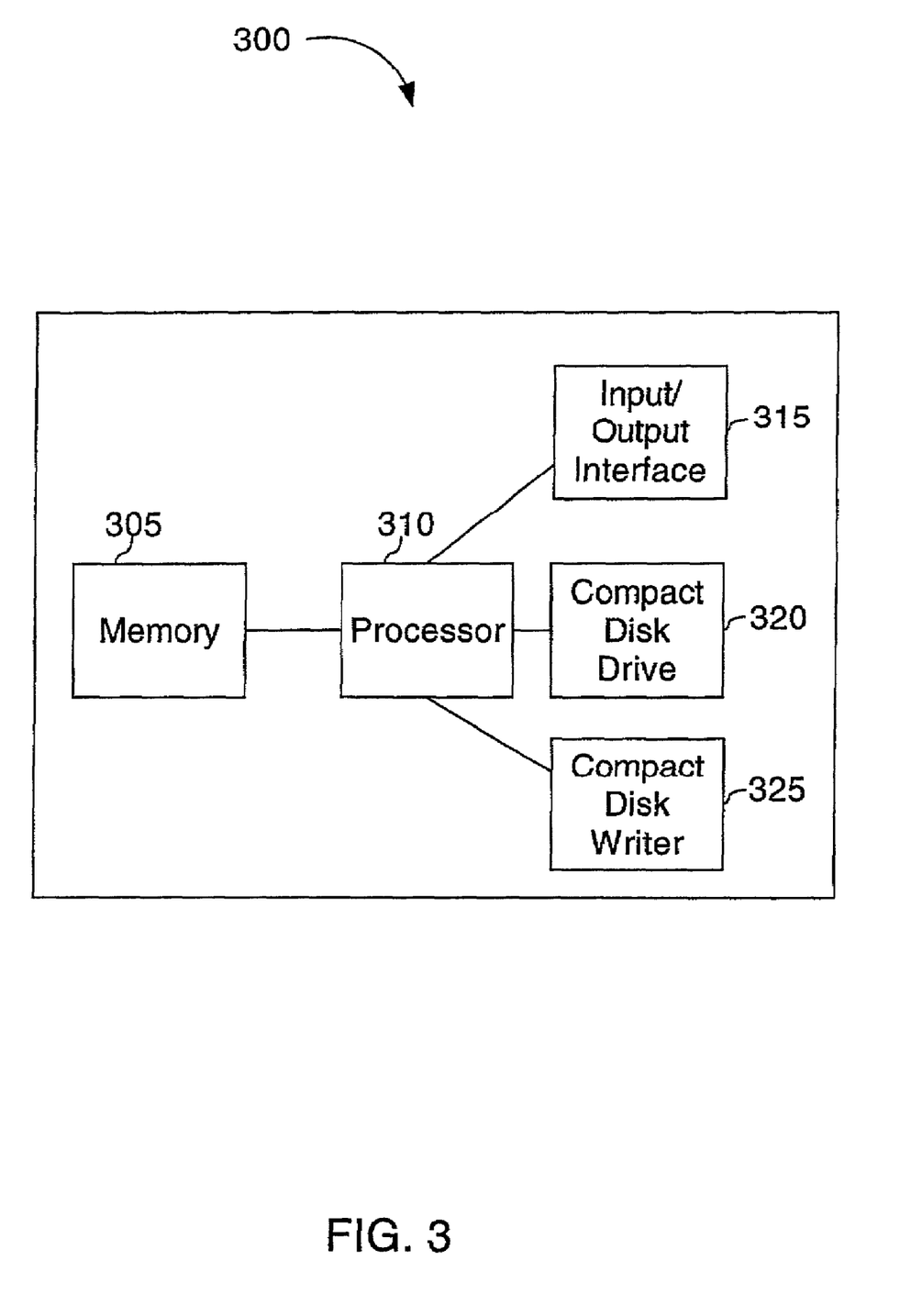
FIG. 3 is an embodiment of an apparatus of the present invention for producing a customized installation procedure.

Referring now to FIG. 3, an embodiment of an apparatus 300 of the present invention for producing a customized installation procedure. In one embodiment of the invention, a customized installation procedure as described in FIGS. 1 and 2 may be produced and transferred to a removable storage media. When a customer receives his or her build to order computer system, he or she may also receive a customized installation procedure that has been produced and transferred to a removable storage media. Upon initial installation of the build to order computer system, the removable storage media may be inserted into the computer system and presented to assist a user in the complete installation and configuration of the computer system.

The apparatus 300 of the present invention may include a memory 305, a processor 310 for executing instructions, an input/output interface 315, a compact disk drive 320 and a compact disk writer 325. After all of the factors of a customized installation procedure as shown in FIG. 2 have been assembled, the processor 310 of the present invention may execute a program of instructions to create a customized installation procedure. Once the customized installation procedure has been produced, a compact disk writer 325 may transfer the customized installation procedure to a removable storage media, such as a compact disk, inserted into the compact disk drive 320.

Figure 4:
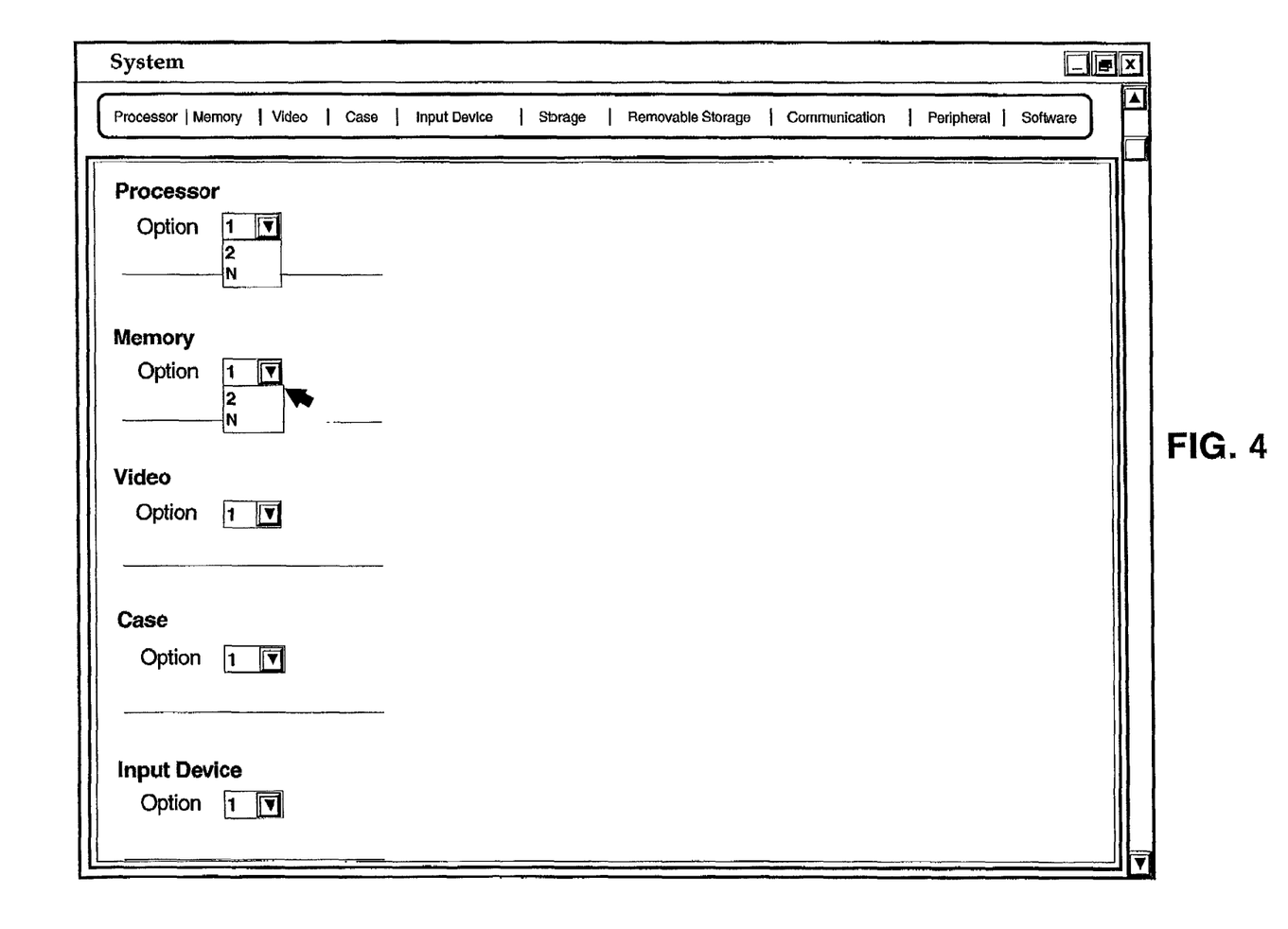
FIG. 4 is an exemplary embodiment of a web-based display in which a user may enter component and configuration selections in accordance with the present invention.
Figure 5:
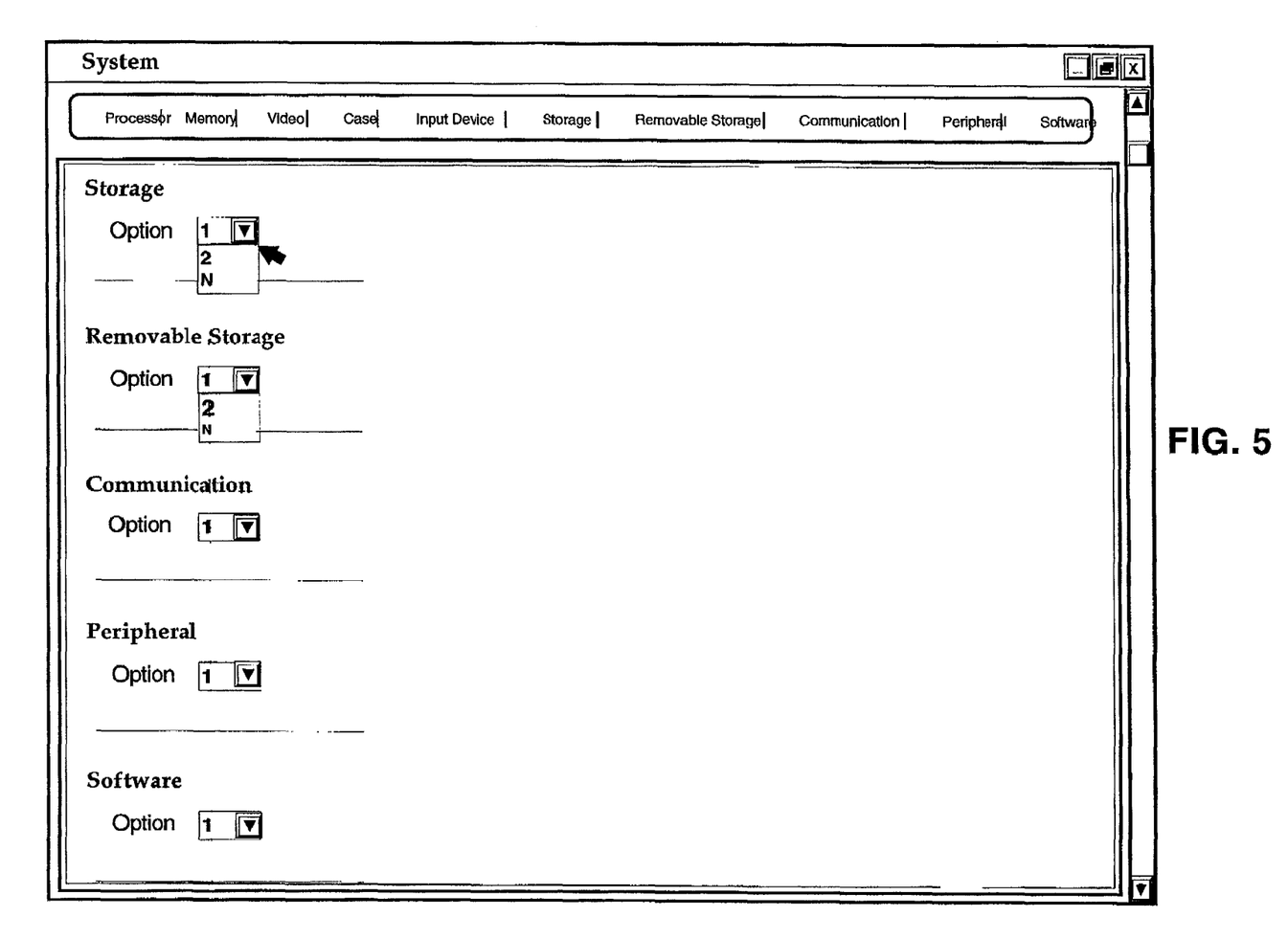
FIG. 5 is an alternative embodiment of a web-based display in which a user may enter component and configuration selections in accordance with the present invention.

In one embodiment of the invention, apparatus 300 is capable of being linked to a worldwide network, such as the world wide web via an input/output interface 315. This is highly advantageous as a user may be capable of entering a user profile and presentation format via a web site maintained by a manufacturer. This information may be received by the manufacturer to analyze in the creation of a customized installation procedure. Further, a user may be capable of making selections of a build to order system through a web site and complete a point of sale online. Referring now to FIGS. 4 and 5, exemplary embodiments of web-based displays in which a user may enter component and configuration selections in accordance with the present invention is shown. In such a fashion, the data for creating a customized material may be retrieved through the web site and assembled to produce a customized installation procedure.

Figure 6:
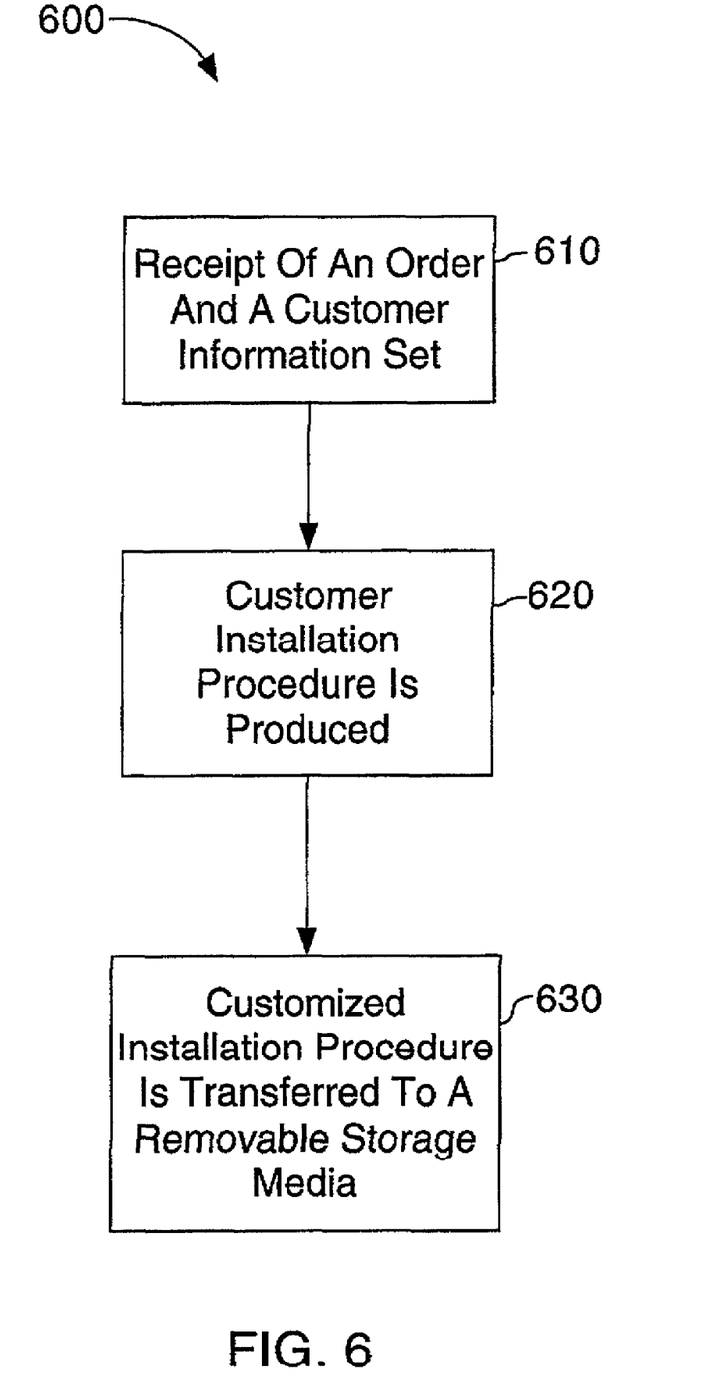
FIG. 6 is an embodiment of a process for generating a customized installation procedure.

Referring to FIG. 6, an embodiment of a process 600 for generating a customized installation procedure is shown. In one embodiment of the invention, process 600 is performed by apparatus 300 as described in FIG. 3 to produce a removable storage media containing a customized installation procedure. Process 600 may begin upon the receipt of an order and a customer information set 610. This may include all of the components purchased at point of sale as would be found in a bill of materials. Further, customer information set may include a user profile and presentation format information as described in FIG. 2. Utilizing the customer information and the order that includes the components, software, and peripherals selected by a user, a customized installation procedure may be produced 620. In one embodiment of the invention, the customized installation procedure may be transferred to a removable storage media 630.

Figure 7:
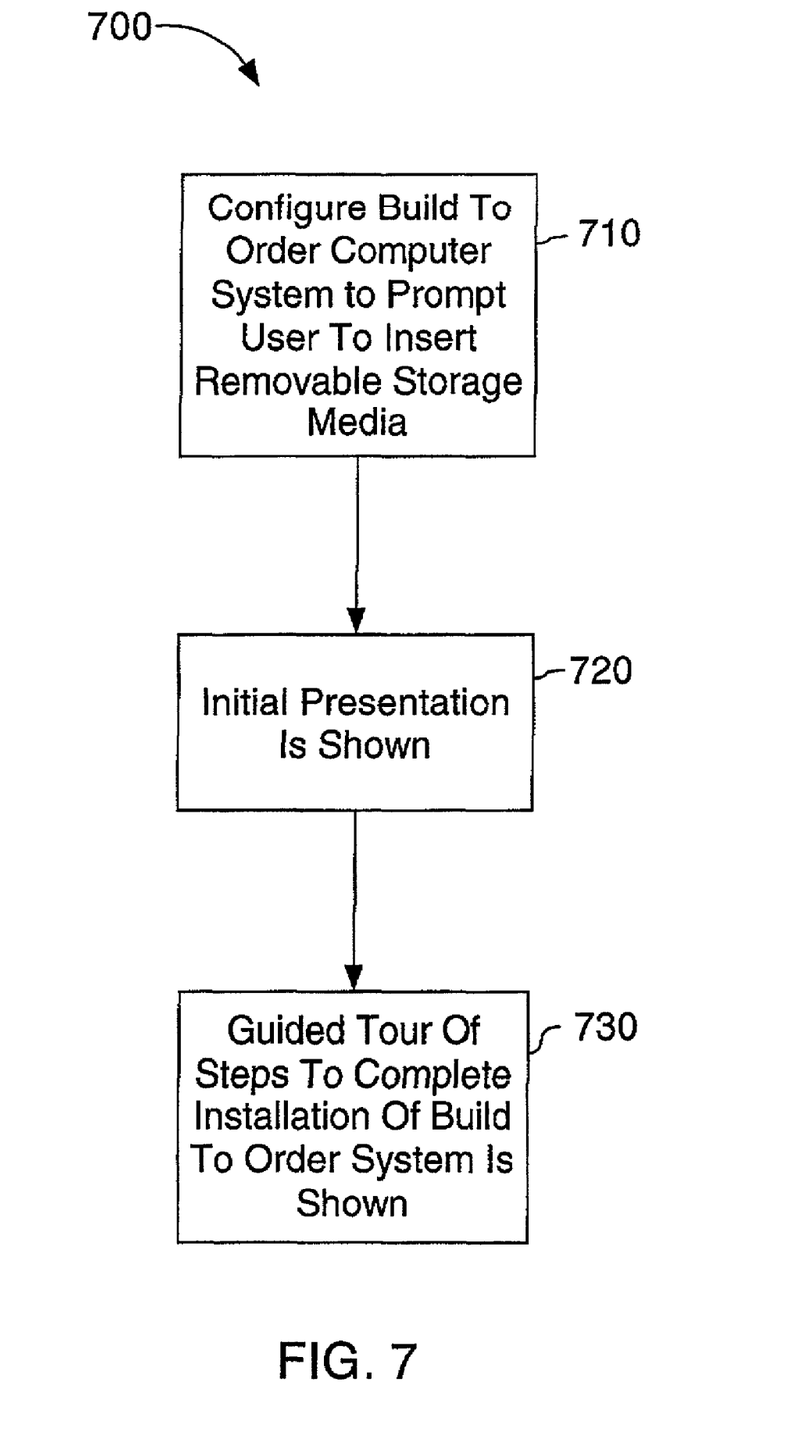
FIG. 7 is an embodiment of a process for providing a customized installation procedure of the present invention.

Referring now to FIG. 7, an embodiment of a process 700 for providing a customized installation procedure of the present invention is shown. Once a customized installation procedure has been produced and transferred to a removable storage media as described in FIG. 4, process 700 describes a method for providing the customized installation procedure of the present invention to a user. Process 700 begins by configuring a build to order computer system that prompts a user to insert a media containing the customized installation procedure into a drive of the computer system 710. The prompting of a user to insert the media containing the customized installation procedure may be after the first boot of the computer system. This may be advantageous for a user because the user may only have to connect a monitor with a central processing unit of the computer system and provide power to the central processing unit and monitor. Thus, once a user boots the computer system, a user may receive a prompt to insert the media.

Once the media has been inserted, an initial presentation is shown on the monitor of a user's build to order computer system 720. In one embodiment, the presentation includes a personalized greeting and a list of the solutions that were purchased with the computer system. The initial presentation may be followed by a guided tour of steps to be undertaken to complete the installation and configuration of the build to order computer system 730. In one embodiment of the invention, as each step is performed and successfully completed, a user may alert the computer system (activation of an input) that the step has been completed. The guided tour may include steps such as prompting the user to insert a software compact disk and to connect various hardware components to the computer system as required by a solution.

It should be understood by one of ordinary skill in the art that while a build to order computer system is applicable for the use of a customized installation procedure of the present invention, a customized installation procedure may be utilized with other types of build to order systems without departing from the scope and spirit of the present invention. Further, while in one embodiment of the invention, a compact disk is disclosed as a type of removable storage media, other types of removable storage media may be utilized by one of ordinary skill in the art including such as a floppy disk, digital versatile disk and the like.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of generating a customized installation procedure for a build to order computer system, comprising:

(a) receiving a customer information set and an order for a build to order system, said customer information set including a user profile and a presentation format, said presentation format including a user-defined technical ability specified by a user, said order including a list of component selections made by the user, said list of component selections including at least three hardware components;

(b) producing a customized installation procedure based on said customer information set including the user profile and the presentation format and based on said order, said customized installation procedure including instructions for installation of said list of component selections; and (c) transferring said customized installation procedure to a removable storage media, wherein said customized installation procedure is a visual presentation to aid said user in the installation of said computer system;

wherein the visual presentation of said customized installation procedure includes instructions for connecting said at least three hardware components, said visual presentation being configured to be displayed on a monitor of said computer system, and wherein, the visual presentation of said customized installation procedure further includes at least one of larger font sizes, musical backgrounds, and personalized greetings that are selected based on the user profile and the presentation format included in said customer information set.

2. The method as claimed in claim 1, wherein said user profile includes at least one of age and sex.

3. The method as claimed in claim 1, wherein said removable storage media includes at least one of a floppy disk, a digital versatile disk, and a compact disk.

4. The method as claimed in claim 1, wherein said list of components includes the user's selections for software, hardware, and peripherals.

5. The method as claimed in claim 1, further comprising:
configuring said computer system to display on said monitor a prompt to insert said removable storage media.

6. The method as claimed in claim 5, wherein said prompt is displayed in response to an initial boot of said computer system.

7. The method as claimed in claim 6, further comprising:
shipping said computer system to the user: wherein the initial boot of said computer system occurs after the shipping of said computer system to the user.

8. The method as claimed in claim 1, wherein said customized installation procedure includes a prompt to insert a compact disk containing a software application; and
wherein said customized installation procedure includes instructions for connecting said at least three hardware components together.

9. The method as claimed in claim 1, further comprising:
receiving user inputs indicating completion of each step of the customized installation procedure.

10. An apparatus for generating a customized installation procedure for a build to order computer system, comprising:
(a) means for receiving a customer information set and an order for said computer system, said customer information set including a user profile and a presentation format, said presentation format including a user-defined technical ability specified by a user, said order including a list of component selections made by the user, said list of component selections including at least three hardware components;
(b) means for producing a customized installation procedure based on said customer information set including the user profile and the presentation format and based on said order, said producing means being coupled to said receiving means, said customized installation procedure including instructions for installation of said list of component selections, and
(c) means for transferring said customized installation procedure to a removable storage media, said transferring means being coupled to said producing means, wherein said customized installation procedure is a visual presentation configured to be displayed on a monitor of said computer system to aid said user in the installation of said computer system;
wherein the visual presentation of said customized installation procedure includes instructions for connecting said at least three hardware components, and
wherein, the visual presentation of said customized installation procedure further includes at least one of larger font sizes, a musical background, and a personalized greeting that is selected based on the user profile and the presentation format included in said customer information set.

11. The apparatus as claimed in claim 10, wherein said receiving means is capable of connecting to a network, wherein said list of component selections made by said user is capable of being received by said receiving means through said network.

12. The apparatus as claimed in claim 11, wherein said network is a world wide web.

13. The apparatus as claimed in claim 10, wherein said user profile includes at least one of age and sex.

14. The apparatus as claimed in claim 10, wherein said removable storage media includes at least one of a floppy disk, a digital versatile disk, and a compact disk.

15. The apparatus as claimed in claim 10, wherein said list of component selections includes the user's selections for software, hardware, and peripherals.

16. The apparatus as claimed in claim 10, wherein said computer system is configured to display on said monitor a prompt to insert said removable storage media.

17. The apparatus as claimed in claim 16, wherein said prompt is displayed in response to an initial boot of said computer system.

18. The apparatus as claimed in claim 10, wherein said customized installation procedure includes a prompt to insert a compact disk containing a software application; and
wherein said customized installation procedure includes instructions for connecting said at least three hardware components together.

19. The apparatus as claimed in claim 10, further comprising:
means for receiving user inputs indicating completion of each step of the customized installation procedure.

20. A method for providing a customized installation procedure, comprising:
(a) configuring a computer system to prompt a user to insert a removable storage media containing a customized installation procedure upon a first boot of said computer system;
(b) displaying on a monitor of said computer system an initial presentation of said customized installation procedure, said customized installation procedure including an instruction to install at least three hardware components; and
(c) presenting a list of steps a user shall undertake to complete installation of said computer system;
wherein said customized installation procedure is based on a customer information set including a user profile and a presentation format, said presentation format including a user-defined technical ability specified by the user, and is based on an order for the computer system which is a build to order system, and
wherein, a visual presentation of said customized installation procedure includes at least one of larger font sizes, a musical background, and a personalized greeting that is selected based on the user profile and the presentation format included in said customer information set.

21. The method as claimed in claim 20, wherein said initial presentation includes a list of solutions that were purchased with said computer system.

22. The method as claimed in claim 20, wherein said list of steps includes insertion of specific storage media and connection of hardware components.

23. The method as claimed in claim 20, further comprising receiving an alert from said user upon completion of a step of said list of steps, wherein a next step of said list of steps is presented.

24. The method as claimed in claim 20, further comprising: configuring said computer system to display on said monitor a prompt to insert said removable storage media.

25. The method as claimed in claim 24, wherein said prompt is displayed in response to an initial boot of said computer system.

26. The method as claimed in claim 25, further comprising: shipping said computer system to the user; wherein the initial boot of said computer system occurs after the shipping of said computer system to the user.

27. The method as claimed in claim 20, said customized installation procedure includes a prompt to insert a compact disk containing a software application; and wherein said customized installation procedure includes instructions for connecting said at least three hardware components together.

28. The method as claimed in claim 20, further comprising: receiving user inputs indicating completion of each step of the list of steps.

* * * * *